United States Patent
Shibata et al.

(10) Patent No.: US 7,579,708 B2
(45) Date of Patent: Aug. 25, 2009

(54) OPENING/CLOSING MEMBER CONTROL APPARATUS AND METHOD FOR DETECTING PINCHING

(75) Inventors: Kazuyuki Shibata, Toyohashi (JP); Kazuyuki Hirai, Kasugai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 28 days.

(21) Appl. No.: 11/516,681

(22) Filed: Sep. 7, 2006

(65) Prior Publication Data

US 2007/0052293 A1 Mar. 8, 2007

(30) Foreign Application Priority Data

Sep. 8, 2005 (JP) ............................. 2005-261227

(51) Int. Cl.
- *B60L 1/00* (2006.01)
- *B60L 3/00* (2006.01)
- *H02P 5/00* (2006.01)
- *G05D 3/00* (2006.01)

(52) U.S. Cl. .................... 307/10.1; 318/465; 318/469
(58) Field of Classification Search ................ 318/469, 318/465; 307/9.1, 10.1
See application file for complete search history.

(56) References Cited

U.S. PATENT DOCUMENTS

| 5,530,329 A | * | 6/1996 | Shigematsu et al. ......... 318/469 |
| 6,274,947 B1 | | 8/2001 | Terashima |
| 2005/0275363 A1 | * | 12/2005 | Honma et al. ............... 318/280 |

FOREIGN PATENT DOCUMENTS

| JP | A-07-158338 | 6/1995 |
| JP | A-2001-248358 | 9/2001 |

* cited by examiner

*Primary Examiner*—Albert W Paladini
*Assistant Examiner*—Michael Rutland Wallis
(74) *Attorney, Agent, or Firm*—Posz Law Group, PLC

(57) ABSTRACT

A power window device includes window glass, an elevating mechanism, and a control device for detecting pinching of a foreign object by the window glass. The control device calculates an amount (a rotation speed variation $\Sigma\Delta\omega_\alpha$) of the pinching based on a variation amount of an opening/closing speed of the window glass, and estimates the amount (a rotation speed variation $\Sigma\Delta\omega_\beta$) of the pinching before the opening/closing speed changes due to the pinching. The control device determines the pinching of the foreign object based on these pinching calculation and estimation amounts.

8 Claims, 5 Drawing Sheets

OPENING/CLOSING MEMBER CONTROL APPARATUS AND METHOD FOR DETECTING PINCHING

CROSS REFERENCE TO RELATED APPLICATION

This application is based on and incorporates herein by reference Japanese Patent Application No. 2005-261227 filed on Sep. 8, 2005.

FIELD OF THE INVENTION

The present invention relates to an opening/closing member control apparatus and a method for detecting pinching, and, particularly to the opening/closing member control apparatus that can detect the pinching of a foreign object in an opening/closing member, and to the method for detecting the pinching by the opening/closing member control apparatus.

BACKGROUND OF THE INVENTION

In a power window device of a vehicle, which has a foreign object pinching restricting function, it is proposed to differentiate reversing timing of window glass according to hardness of a foreign object that is pinched between a vehicle chassis and the window glass (for example, JP 2001-248358A). In this manner, by differentiating the reversing timing according to the hardness of the foreign object pinched, an excessive pinch load can be reduced from being applied to the foreign object pinched.

Generally, in the power window device like this, a rotation speed and a rotation speed difference of an electric motor, which are used for calculating a pinch load, are calculated based on a speed signal (for example, a pulse signal) from a rotation speed sensor arranged in the electric motor. In such calculation processing, in order to cancel error variation amounts of the rotation speed and the rotation speed difference, a moving average of a plurality of temporally sequential calculated values is calculated. Therefore, the pinch load that is calculated includes a delay as compared to an actual pinch load.

Thus, due to this delay in detection timing, by the time the pinch load is calculated by a pinching detecting part, a load will have already been applied to the foreign object according to its properties such as the hardness or deformability. For this reason, when a detected load reaches a predetermined value, the pinch load in accordance with its properties is practically applied to the foreign object, that is, the excessive pinch load is applied.

As well, in a case where a soft object is pinched, because the foreign object is deformed while initially pinched by the window glass, the pinch load hardly increases. Thus, after the foreign object is deformed to some extent, the pinch load starts to increase. The pinching detecting part can detect pinching when the pinch load increases and the detected load reaches the predetermined value.

Hence, even if a soft foreign object is pinched by the window glass, the detected load does not reach the predetermined value unless a certain amount of time elapses including a period during which the foreign object is deformed. Consequently, the foreign object remains constrained to the window glass for a relatively long time with a reversing operation of the window glass unperformed.

Moreover, since the electric motor and a drive mechanism, which are included in a drive part that moves up and down the window glass, have play and a backlash, a decrease in the rotation speed of the electric motor is absorbed by the play and the backlash during an initial phase of the pinching by the window glass.

The pinching detecting part calculates the pinch load (a pinched amount) from a variation (the decrease) and the like in the rotation speed (the number of rotations) of the electric motor, but timing is delayed with which the rotation speed of the electric motor starts to decrease due to the play and the backlash during the initial phase of the pinching. As a result, the timing is delayed with which the detected load starts to increase, thereby delaying the timing with which the detected load reaches the predetermined value. Accordingly, the foreign object remains constrained to the window glass for the relatively long time with the reversing operation of the window glass unperformed.

SUMMARY OF THE INVENTION

The present invention aims for provision of an opening/closing member control apparatus and a method for detecting pinching, which can determine the pinching by evaluating a pinched amount, which has been produced before the pinched amount is detected, and can avoid an excessive pinch load and a state of prolonged pinching.

According to one aspect of the present invention, the opening/closing member control apparatus includes an opening/closing member, a drive part that opens and closes the opening/closing member, and a pinching detecting part that detects the pinching of a foreign object in the opening/closing member while it is being opened or closed. This pinching detecting part calculates the pinched amount of the foreign object and estimates a previous pinched amount, thereby determining the pinching of the foreign object based on a pinching calculation amount and a pinching estimation amount.

The pinched amount is calculated based on the pinching in the opening/closing member, an operating state of the opening/closing member, a variation in an opening/closing speed of the opening/closing member, and the like. In addition, the previous pinched amount is estimated based on the pinching calculation amount, a variation in a rotation speed of the drive part, and the like. In consequence, the pinching estimation amount can be calculated according to properties of the foreign object pinched. For example, the pinching detecting part may be designed to calculate the pinching estimation amount according to a deceleration rate of the rotation speed, thereby advancing or delaying timing of a determination of the pinching according to hardness of the foreign object pinched.

DETAILED DESCRIPTION OF THE PREFERRED EMBODIMENT

Figure 1:
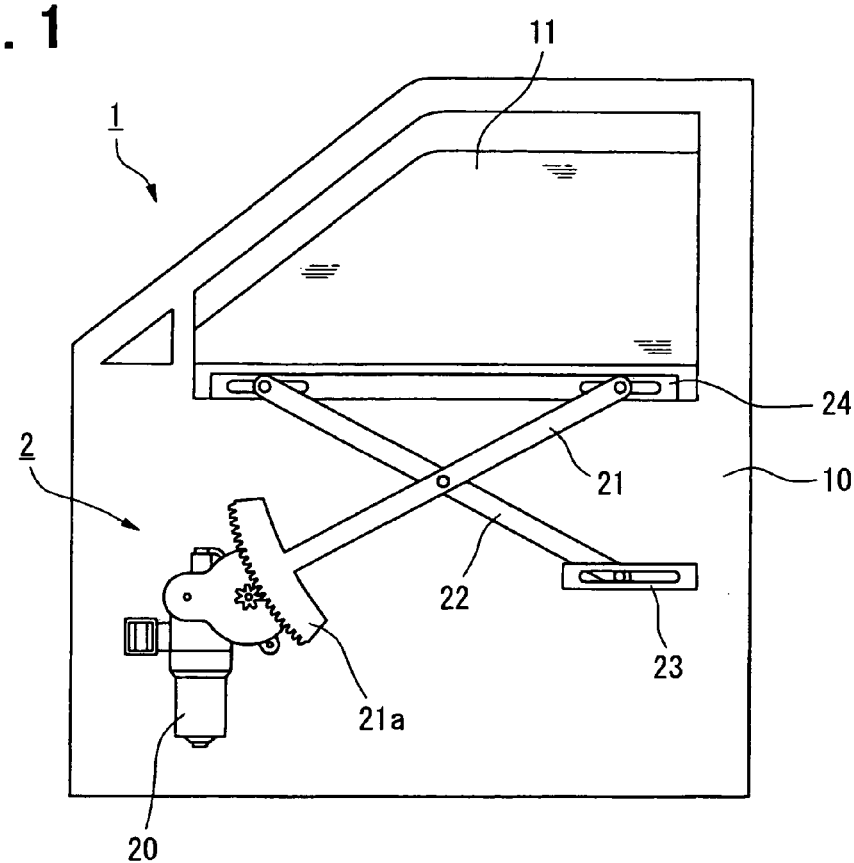
FIG. 1 is a schematic diagram of a power window device according to an embodiment of the present invention.
Figure 2:
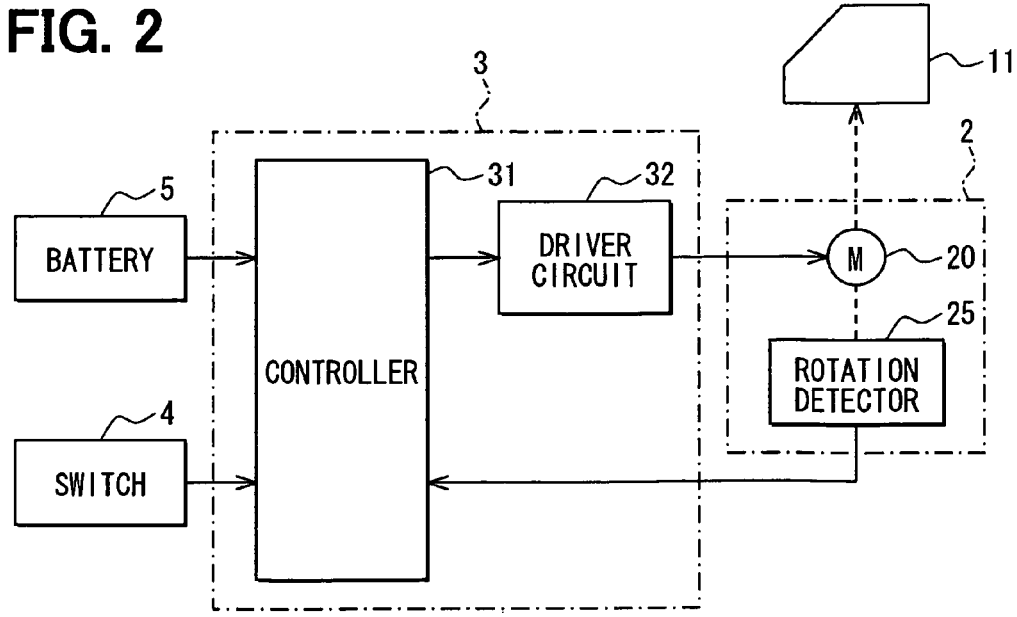
FIG. 2 is a block diagram of the power window device in FIG. 1.

With reference to FIGS. 1, 2, a power window device 1 moves up and down (closes and opens) window glass 11 as an opening/closing member arranged in a door 10 of a vehicle by a rotary drive of a motor 20. An elevating mechanism 2 that opens and closes the window glass 11, a control device 3 to control an operation of the elevating mechanism 2, and an operating switch 4 for an occupant to command the operation are main components of the power window device 1.

The window glass 11 moves along a rail (not shown) up and down between an upper fully closed position and a lower fully open position. The motor 20 having a speed reducing mechanism secured to the door 10, an elevating arm 21 with a fan-shaped gear 21a driven by the motor 20, a driven arm 22 pivoted crossing the elevating arm 21, a fixed channel 23 fixed to the door 10, and a glass-side channel 24 integrated with the window glass 11 are main components of the elevating mechanism 2.

The motor 20 is configured such that a rotor rotates forward and reverse as a result of a magnetic attraction effect generated between the rotor and a stator having a magnet by energizing a winding of the rotor after receiving an electric power supply from the control device 3. In the elevating mechanism 2, when the elevating arm 21 and the driven arm 22 oscillate depending on rotation of the motor 20, sliding of their each end is restricted by the channels 23, 24, and the elevating arm 21 and the driven arm 22 are driven as an X-link, thereby moving up and down the window glass 11.

The motor 20 is integrated with a rotation detector (a position detector) 25 to detect a movement speed. The rotation detector 25 outputs a pulse signal (a speed detection signal, a rotation speed signal), which is synchronized with the rotation of the motor 20, to the control device 3. The rotation detector 25 is configured to detect a magnetic variation of the magnet that rotates with an output shaft of the motor 20 by a plurality of Hall elements. By virtue of this configuration, the rotation detector 25 outputs the pulse signal synchronized with the rotation of the motor 20. That is, the pulse signal is outputted according to each predetermined movement of the window glass 11 or each predetermined rotation angle of the motor 20. Accordingly, the rotation detector 25 outputs a signal that corresponds to a movement of the window glass 11, which is approximately proportional to a rotation speed of the motor 20.

The control device 3 calculates a rising and falling position of the window glass 11 by this pulse signal. Besides, the control device 3 calculates the rotation speed of the motor 20, or a rising and falling speed of the window glass 11, which corresponds to this, from an interval between the pulse signals.

In addition, the Hall element can be employed for the rotation detector 25. However, a known detector such as an encoder may be employed, or the rotation speed may be detected by detecting a torque ripple during the rotation of the motor 20, as long as the rotation detector 25 can detect the rotation speed of the motor 20.

The control device 3 includes a controller 31 and a driver circuit 32. The controller 31 and the driver circuit 32 are fed with electric power, which is necessary for their operations by a battery 5 that is mounted in the vehicle.

The controller 31 includes a microcomputer that has a CPU, memories such as a ROM and a RAM, an input circuit, an output circuit, and the like. The CPU, the memories, the input circuit, and the output circuit are connected to one another via a bus. Additionally, without being limited to this, the controller 31 may include a digital signal processor (DSP) gate array.

The controller 31 normally rotates the motor 20 forward and reverse through the driver circuit 32 based on an operating signal from the operating switch 4, thereby opening and closing the window glass 11. Also, the controller 31 receives the pulse signal from the rotation detector 25, and can detect a foreign object being pinched between an upper edge of the window glass 11 and a window frame, based on the pulse signal. If the foreign object is detected being pinched, the controller 31 rotates the motor 20 in an opening direction via the driver circuit 32, and opens the window glass 11.

The driver circuit 32 includes an IC that has an FET, and reverses polarity of the electric power supply to the motor 20 based on an input signal from the controller 31. That is, the driver circuit 32 feeds the electric power to the motor 20 in order to rotate the motor 20 in a forward rotating direction when the driver circuit 32 receives a forward rotation command signal from the controller 31, and feeds the electric power to the motor 20 in order to rotate the motor 20 in a reverse rotating direction when the driver circuit 32 receives a reverse rotation command signal from the controller 31. In addition, the driver circuit 32 may be configured to reverse the polarity using a relay circuit. As well, the driver circuit 32 may be configured such that the driver circuit 32 is incorporated into the controller 31.

The controller 31 detects a rising or falling part (a pulse edge) of the pulse signal in the pulse signal that is inputted, and detects a rotating direction of the motor 20 based on a phase difference between each pulse signal. It also calculates the rotation speed (a rotational period) of the motor 20 based on an interval (a period, a pulse width) between the pulse edges. In other words, the controller 31 indirectly calculates the movement speed of the window glass 11 based on the rotation speed (the rotational period) of the motor 20, and identifies a moving direction of the window glass 11 based on the rotating direction of the motor 20. Besides, the controller 31 counts the pulse edges. This pulse count value is added or subtracted according to an opening and closing movement of the window glass 11. The controller 31 identifies an opening and closing position of the window glass 11 by a magnitude of the pulse count value.

The operating switch 4 includes a swing type switch or the like, which allows a two-step operation, and has an opening switch, a closing switch and an auto switch. By the occupant operating this operating switch 4, a command signal to open and close the window glass 11 is outputted to the controller 31.

More specifically, when the operating switch 4 is operated toward its one end side by one step, the opening switch is turned on, and the operating switch 4 outputs to the controller 31 a normal opening command signal to perform a normal opening operation (i.e., an opening operation only while operating) on the window glass 11. Also, when the operating switch 4 is operated toward the other end side by one step, the closing switch is turned on, and the operating switch 4 outputs to the controller 31 a normal closing command signal to perform a normal closing operation (i.e., a closing operation only while operating) on the window glass 11.

In addition, when the operating switch 4 is operated toward its one end side by two steps, both the opening switch and the auto switch are turned on, and the operating switch 4 outputs to the controller 31 an auto opening command signal to perform an auto opening operation (i.e., the opening operation to a fully open position even after the operation is stopped) on the window glass 11. Also, when the operating switch 4 is operated toward the other end side by two steps, both the closing switch and the auto switch are turned on, and the operating switch 4 outputs to the controller 31 an auto closing command signal to perform an auto closing operation (i.e., the closing operation to a fully closed position even after the operation is stopped) on the window glass 11.

The controller 31 performs the normal opening operation on the window glass 11 by driving the motor 20 through the driver circuit 32 all the while that the controller 31 is receiving the normal opening command signal from the operating switch 4 (all the while that the operating switch 4 is being operated). On the other hand, the controller 31 performs the normal closing operation on the window glass 11 by driving the motor 20 through the driver circuit 32 all the while that the controller 31 is receiving the normal closing command signal from the operating switch 4 (all the while that the operating switch 4 is being operated).

Furthermore, when the controller 31 receives the auto opening command signal from the operating switch 4, the controller 31 performs the auto opening operation on the window glass 11 to the fully open position by driving the motor 20 through the driver circuit 32. On the other hand, when the controller 31 receives the auto closing command signal from the operating switch 4, the controller 31 performs the auto closing operation on the window glass 11 to the fully closed position by driving the motor 20 through the driver circuit 32.

The controller 31 monitors presence or absence of pinching by the window glass 11 while performing the closing operation (the normal closing operation and the auto closing operation) on the window glass 11. That is, when the pinching is generated, the movement speed of the window glass 11, and in conjunction with this, the rotation speed of the motor 20 decrease (the rotational period lengthens). Because of this, the controller 31 constantly monitors a variation in the rotation speed of the motor 20.

The controller 31 determines (confirms) the pinching when the controller 31 detects a start of the pinching based on this variation in the rotation speed, and then detects that the rotation speed has varied by a predetermined amount since the detection of the start of the pinching.

When the pinching is confirmed, the controller 31 reverses the motor 20 to release the foreign object pinched by the window glass 11, and controls the window glass 11 so as to perform the opening operation by a predetermined amount. In addition, when the pinching is determined, the window glass 11 may be controlled so that the foreign object pinched by the window glass 11 can be released, by stopping an operation of the motor 20, thereby stopping a further closing operation of the window glass 11.

Next, based on FIGS. 3A, 3B, 3C, general processing of a determination of the pinching in the power window device 1 will be described. In the power window device 1, the rotation speed ω of the motor 20 is calculated based on the pulse signal received from the rotation detector 25. In calculation processing, based on a number (n) of sequential pulse signals including the pulse signal received at that point and the pulse signal received before then, the rotation speed ω is calculated from these pulse widths. In this manner, by calculating the rotation speed ω from a plurality of pulse signals, an error variation can be canceled in processing data.

Figure 3A:
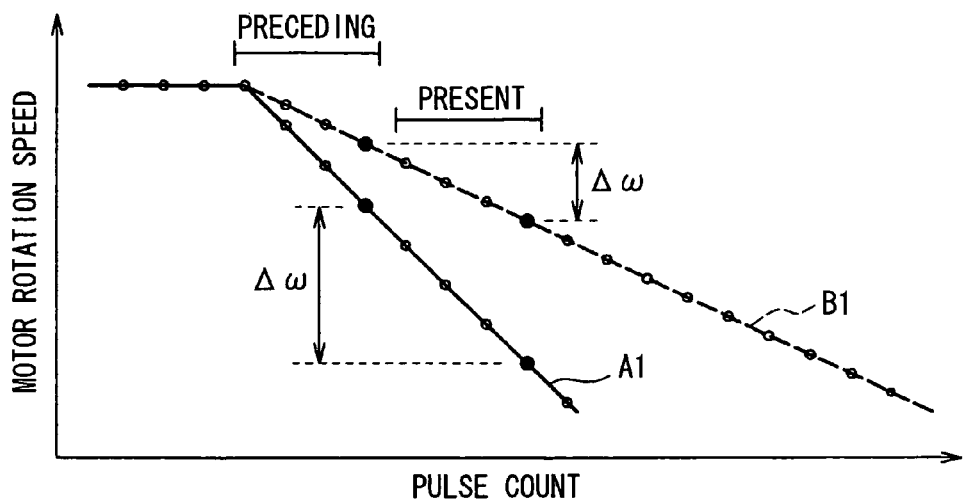
FIGS. 3A, 3B, 3C are time charts showing a determination of pinching.
Figure 3B:
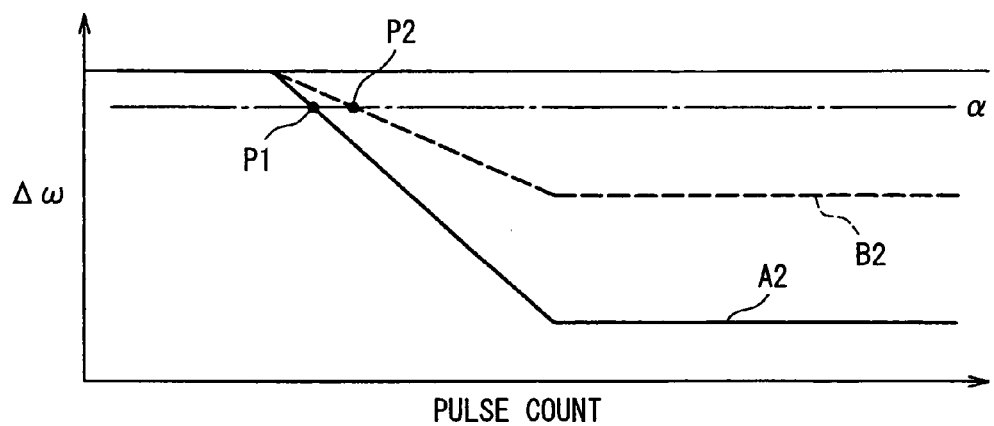
Figure 3C:
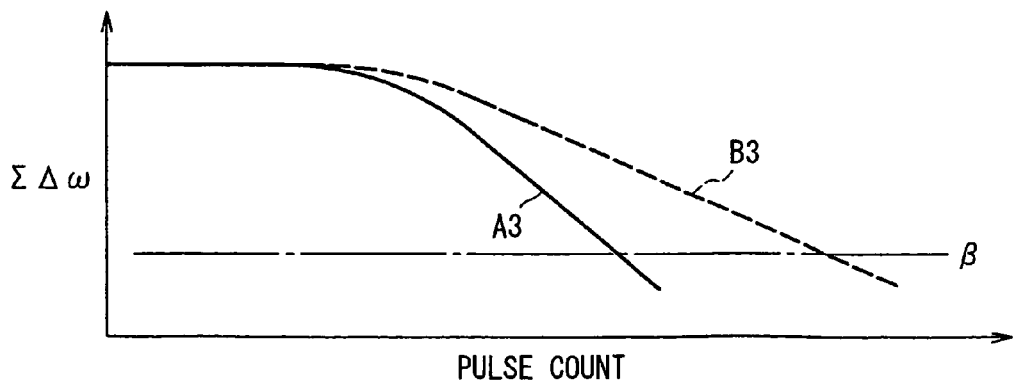

FIG. 3A shows a state of the variation in the rotation speed ω, which is calculated in this manner. A vertical axis of FIG. 3A corresponds to a motor rotation speed, and a horizontal axis corresponds to the number of pulse counts. This example illustrates a state where the rotation speed ω of the motor 20 decreases halfway due to the pinching. A data line A1 shows a state where the rotation speed ω decreases at a high deceleration rate by pinching a hard object. A data line B1 shows a state where the rotation speed ω decreases at a low deceleration rate by pinching a soft object. Additionally, in FIGS. 3B, 3C, data lines A2, A3 correspond to a case where the hard object is pinched, and data lines B2, B3 correspond to a case where the soft object is pinched.

Then, in the power window device 1, every time the pulse signal is received, a rotation speed difference $\Delta\omega$, which is a difference between the present rotation speed ω and the rotation speed ω, which is k (in this case, four) pulses before the present rotation speed ω, is calculated. The rotation speed difference $\Delta\omega$ corresponds to a changing rate of the rotation speed (the movement speed). FIG. 3B shows the state of the variation in the rotation speed difference $\Delta\omega$. Additionally, in FIG. 3A, it can be found that an absolute value of the rotation speed difference $\Delta\omega$ in the data line A1 is larger as compared to the data line B1.

Subsequently, whether or not the rotation speed difference $\Delta\omega$ calculated in this manner exceeds a variation determination threshold $\alpha$ is determined first. When this variation determination threshold $\alpha$ is exceeded, the start of the pinching is determined. In FIG. 3B, the start of the pinching is detected at a point P1 and a point P2, respectively. Nevertheless, because the pinching is not determined at this point, the motor 20 continues rotating and the window glass 11 continues rising. This variation determination threshold $\alpha$ is arranged such that even if the power window device 1 pinches the soft object, the rotation speed difference $\Delta\omega$ caused by this pinching exceeds this value.

Since the rotation speed difference $\Delta\omega$ is a difference between the rotation speed ω that is calculated based on the plurality of sequential pulse signals and the rotation speed ω that is k pulses before the former rotation speed ω, the rotation speed difference $\Delta\omega$ has a delay in a time variation, which corresponds to a predetermined number of pulse signals (delayed pulse signals) in comparison with an actual rotation speed difference $\Delta\omega$. That is, it is a predetermined delayed time after an actual start of the pinching that the start of the pinching is detected in processing the data. Therefore, when the rotation speed difference $\Delta\omega$ exceeds the variation determination threshold $\alpha$, the pinching has already been generated for a period corresponding to the number of the delayed pulse signals, and a pinch load has been applied to the foreign object pinched.

In this case, once the start of the pinching is detected, a cumulative sum $\Sigma\Delta\omega_\alpha$ (i.e., the variation in the rotation speed ω, hereafter 'a rotation speed variation $\Sigma\Delta\omega_\alpha$') of the rotation speed difference $\Delta\omega$ from this point is calculated. More specifically, the rotation speed variation $\Sigma\Delta\omega_\alpha$ is calculated as an additional value of the rotation speed difference $\Delta\omega$ after the start of the pinching is detected.

In the present example, the rotation speed variation $\Sigma\Delta\omega_\alpha$, is employed as a calculated pinched amount to determine a degree of the pinching, or a state (a state of the pinching), which is from a state where the start of the pinching is determined by an influence of the pinching of the foreign object upon the rotation speed difference $\Delta\omega$ through to a state where the pinching is detected (confirmed) as a result of an increase in the pinch load.

Besides, in this example, estimation processing is performed on a cumulative sum $\Sigma\Delta\omega_\beta$ (hereafter 'a rotation speed variation $\Sigma\Delta\omega_\beta$') of the rotation speed difference $\Delta\omega$. The rotation speed variation $\Sigma\Delta\omega_\beta$ corresponds to the above number of the delayed pulses. More specifically, an average rotation speed difference $\Delta\omega_{ave}$ from the present rotation speed difference $\Delta\omega$ to the rotation speed difference $\Delta\omega$ that is p pulse signals before the present rotation speed difference $\Delta\omega$ is calculated, and this average rotation speed difference $\Delta\omega_{ave}$ is seen as the rotation speed difference during a delay period. The rotation speed variation $\Sigma\Delta\omega_\beta$ during the delay period is calculated by multiplying the average rotation speed difference $\Delta\omega_{ave}$ by the number of the delayed pulse signals.

The rotation speed variation $\Sigma\Delta\omega_\beta$ is employed as an estimated pinched amount to estimate the state of the pinching or the degree of the pinching before the rotation speed variation $\Sigma\Delta\omega_\alpha$, which is the calculated pinched amount, can be calculated. That is, this rotation speed variation $\Sigma\Delta\omega_\beta$ is a pinched amount that is not directly identifiable based on an operating state, which has arisen before the rotation speed variation $\Sigma\Delta\omega_\alpha$ that is identifiable from the operating state is calculated.

In addition, since the average rotation speed difference $\Delta\omega_{ave}$ that is calculated varies according to properties such as hardness and deformability of the foreign object pinched, the rotation speed variation $\Sigma\Delta\omega_\beta$, which is the estimated pinched amount, is appropriately set according to the properties of the foreign object as well.

Then, the pinched amount (a rotation speed variation $\Sigma\Delta\omega_t$), which is obtained through adding the estimated pinched amount (the rotation speed variation $\Sigma\Delta\omega_\beta$) that should have practically influenced the rotation speed $\omega$ before the start of the pinching is detected, and the calculated pinched amount (the rotation speed variation $\Sigma\Delta\omega_\alpha$) calculated after the start of the pinching is detected, is employed for the determination of the pinching.

That is, whether or not this rotation speed variation $\Sigma\Delta\omega_t$ exceeds a pinching determination threshold $\beta$ is determined, and the pinching is detected (confirmed) when the rotation speed variation $\Sigma\Delta\omega_t$ exceeds the pinching determination threshold $\beta$. FIG. 3C shows the state of the variation in the rotation speed variation $\Sigma\Delta\omega_t$. The controller 31 determines (confirms) the pinching when the rotation speed variation $\Sigma\Delta\omega_t$ exceeds the pinching determination threshold $\beta$.

Additionally, although the rotation speed variation $\Sigma\Delta\omega_\beta$ that is the estimated pinched amount is calculated by multiplying the average rotation speed difference $\Delta\omega_{ave}$ from p pulse signals before, by the number of the pulse signals corresponding to the delay period, yet without applying only to this, the estimated pinched amount may be calculated by an appropriate method in a context of an actual situation. For example, the rotation speed variation $\Sigma\Delta\omega_\beta$ may be set in stages according to a magnitude of the average rotation speed difference $\Delta\omega_{ave}$, or the number of the pulse signals to be multiplied may be set differently according to the magnitude of the average rotation speed difference $\Delta\omega_{ave}$.

As well, while the variation in the rotation speed $\omega$ is employed as the pinched amount, yet without being limited to this, other variations may be employed as the pinched amount. For instance, a variation in the movement speed of the window glass 11, a variation in movement of a mechanical part, or the like may be employed.

Figure 4:
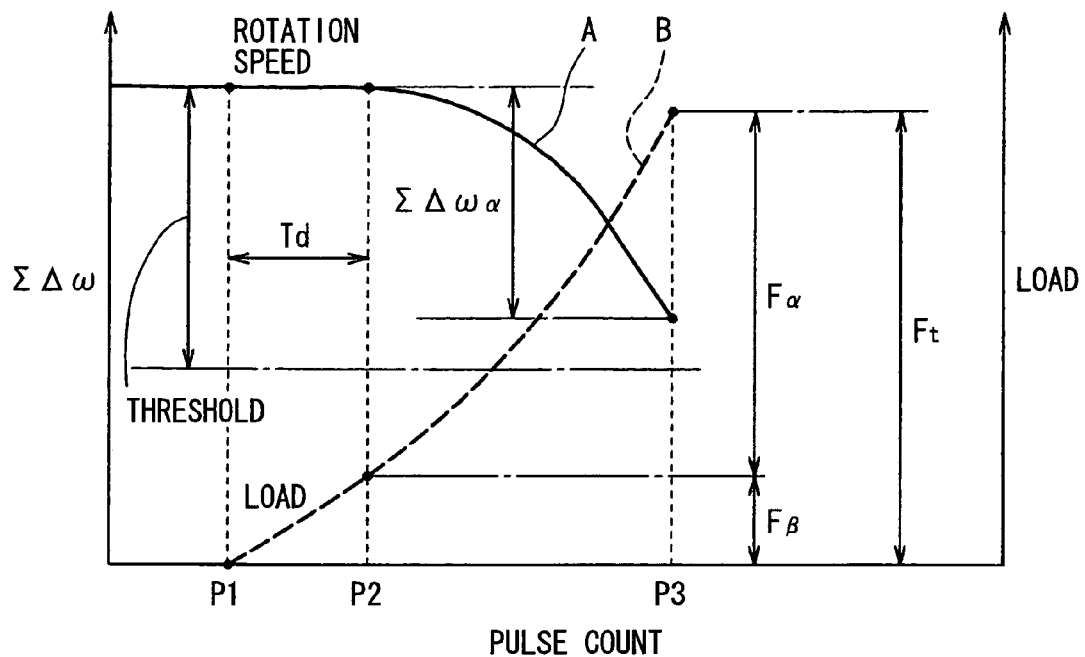
FIG. 4 is a time chart showing a determination of pinching without evaluating a pinching estimation amount.
Figure 5:
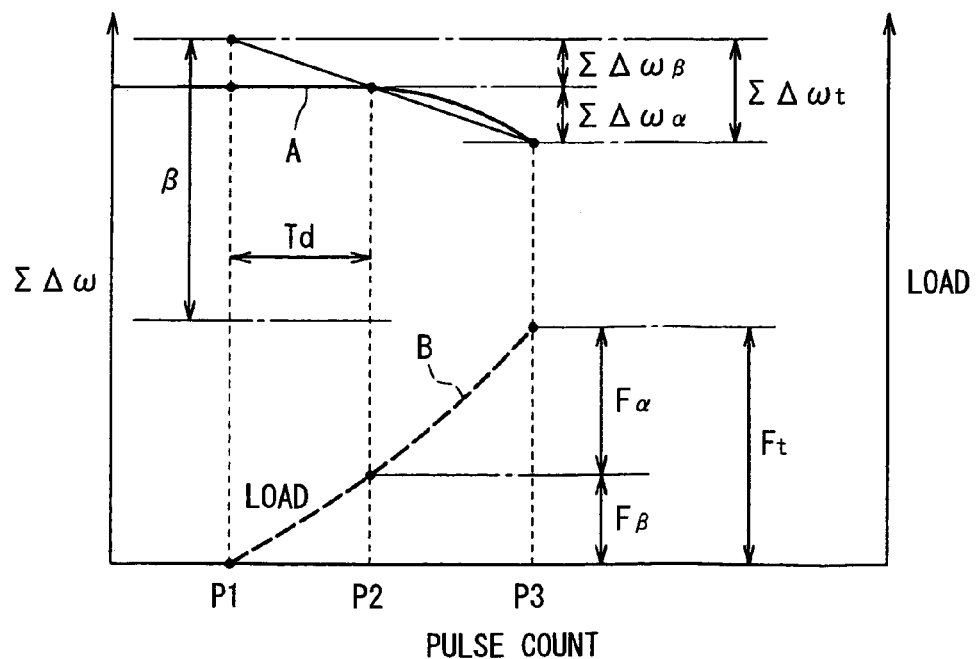
FIG. 5 is a time chart showing a determination of pinching when a pinching estimation amount is evaluated.

Based on FIGS. 4, 5, a comparison will be made between a case (FIG. 4) where the rotation speed variation $\Sigma\Delta\omega_\beta$ during the delay period is not evaluated, and a case (FIG. 5) where the rotation speed variation $\Sigma\Delta\omega_\beta$ is evaluated. FIGS. 4, 5 show variations in a rotation speed $\Sigma\Delta\omega$ (the cumulative sum of the rotation speed difference $\Delta\omega$) and in the pinch load applied to the foreign object pinched. A line A and a line B show the variations in the rotation speed $\Sigma\Delta\omega$ and in the pinch load, respectively. As shown in FIG. 4, the pinching starts at a pulse count P1. However, at a pulse count P2, before which a delay period Td elapses from the pulse count P1, an influence emerges of the decrease in the rotation speed due to the pinching upon the rotation speed $\Sigma\Delta\omega$ that is calculated.

In the example shown in FIG. 4, the pinching can be determined when the rotation speed variation $\Sigma\Delta\omega_\alpha$, which is the cumulative sum of the rotation speed difference $\Delta\omega$ from the pulse count P2, exceeds a predetermined pinching threshold. A variation at up to a pulse count P3 is shown in FIG. 4, and at this point, a pinching detection load (a pinching detected amount) $F_\alpha$, into which the rotation speed variation $\Sigma\Delta\omega_\alpha$ that is calculated is converted, is detected.

Nevertheless, because a delayed load (the estimated pinched amount) $F_\beta$ is applied to the foreign object pinched during the delay period Td, it may be considered that a pinch load $F_t$ ($=F_\alpha+F_\beta$), which is a summation of these, is practically applied to the foreign object at the pulse count P3.

At the pulse count P2, the influence of the decrease in the rotation speed due to the pinching upon the rotation speed $\Sigma\Delta\omega$ that is calculated emerges. In determining the pinching based on the rotation speed variation $\Sigma\Delta\omega_\alpha$ after the pulse count P2, the pinch load that is heavier than it really is is applied to the foreign object, so that it is possible for the pinch load to be excessive.

On the other hand, as shown in FIG. 5, the pinching starts at the pulse count P1, and it is at the pulse count P2 before which the delay period Td elapses from the pulse count P1 that the influence of the decrease in the rotation speed due to the pinching upon the rotation speed $\Sigma\Delta\omega$ that is calculated emerges. Nevertheless, in the example shown in FIG. 5, at the pulse count P3 after the pulse count P2, whether or not the pinching is generated is determined based on the rotation speed variation $\Sigma\Delta\omega_t$, which results from an addition of the rotation speed variation $\Sigma\Delta\omega_\beta$ that is the estimated pinched amount to the rotation speed variation $\Sigma\Delta\omega_\alpha$, at the pulse count P3.

Thus, at the pulse count P3, the summation of the pinching detection load $F_\alpha$, corresponding to the rotation speed variation $\Sigma\Delta\omega_\alpha$, and the delayed load (the estimated pinched amount) $F_\beta$ corresponding to the rotation speed variation $\Sigma\Delta\omega_\beta$, is estimated to be applied to the foreign object as the pinch load $F_t$.

In this manner, when the pinching is determined by evaluating the rotation speed variation $\Sigma\Delta\omega_\beta$ that is the estimated pinched amount before the pulse count P2, in addition to the rotation speed variation $\Sigma\Delta\omega_\alpha$, after the pulse count P2, at which the influence of the decrease in the rotation speed due to the pinching emerges, the pinching can be determined by the pinched amount that approximates the pinch load practically applied to the foreign object, thereby avoiding the pinch load applied to the foreign object becoming excessive.

Additionally, when the soft object is pinched, the pinch load hardly increases since the foreign object is deformed while initially pinched, and the pinch load starts to increase after the foreign object is deformed to some extent. That is, the influence of the pinching upon the rotation speed $\Sigma\Delta\omega$ does not emerge while the foreign object is initially being pinched.

As well, since the elevating mechanism 2, which moves up and down the window glass 11, has play and a backlash, the decrease in the rotation speed $\Sigma\Delta\omega$ is absorbed by the play and the backlash while the foreign object is initially being pinched, thereby delaying emergence of the influence of the pinching upon the rotation speed $\Sigma\Delta\omega$.

Hence, even though the foreign object is pinched, the start of the pinching is not detected unless a certain amount of time elapses including a period of the absorption of the decrease in the rotation speed $\Sigma\Delta\omega$ by the play and the backlash and a period of the deformation of the foreign object. Therefore, after an actual start of the pinching, it takes the rotation speed variation $\Sigma\Delta\omega_\alpha$ a relatively long time to exceed the pinching determination threshold $\beta$, and meanwhile, the foreign object remains pinched.

However, the rotation speed variation $\Sigma\Delta\omega_\beta$, which is the pinched amount immediately before the start of the pinching is detected, is estimated, and the pinching is determined (confirmed) based on the addition of the rotation speed variation $\Sigma\Delta\omega_\alpha$ and the rotation speed variation $\Sigma\Delta\omega_\beta$. Consequently, by an additional amount of the rotation speed variation $\Sigma\Delta\omega_\beta$, the pinching is determined earlier. That is, this rotation speed variation $\Sigma\Delta\omega_\beta$ is the pinched amount that is not directly identifiable based on the operating state, which has arisen before the rotation speed variation $\Sigma\Delta\omega_\alpha$ identifiable from the operating state is calculated.

By virtue of this, in the present example, the foreign object can be released early from the state of the pinching without keeping it pinched for the relatively long time.

Figure 6:
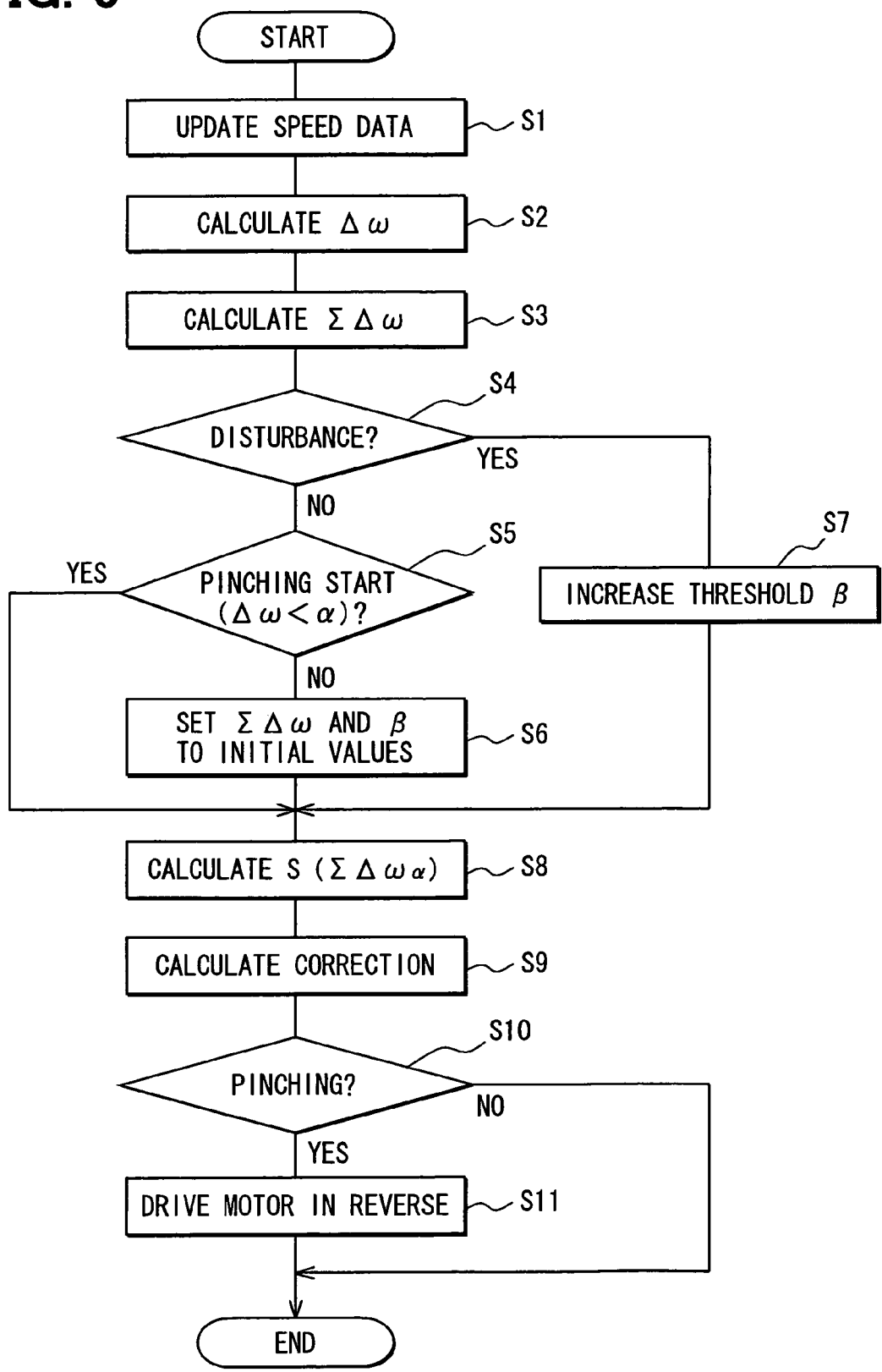
FIG. 6 is a flowchart showing determination processing of pinching by a controller in FIG. 2.

Next, based on FIGS. 6, 7, pinching determination processing in the controller 31 will be described.

Firstly, the controller 31 updates rotation speed data of the motor 20 based on the pulse signal received from the rotation detector 25 (step S1). More specifically, the controller 31 first performs signal processing on the pulse signal received from the rotation detector 25, and detects the pulse edge. Then, whenever the pulse edge is detected, the controller 31 calculates the pulse width (a time interval) T between the pulse edge detected previous time and the pulse edge detected this time, and stores it in the memory sequentially.

The pulse width T is updated in forward rotation every time a new pulse edge is detected, and the latest four pulse widths T(0) to T(3) are stored. That is, when the pulse edge is detected, as well as calculating a new pulse width T(0), the controller 31 shifts the respective previous pulse widths T(0) to T(2) one by one, and stores each of them as pulse widths T(1) to T(3), so that the previous pulse width T(3) is deleted.

Then, the controller 31 calculates the rotation speed $\omega$ from an inverse of a summation (a pulse period P) of pulse widths T of temporally sequential n pulse edges. This rotation speed $\omega$ is proportional to an actual rotation speed.

In this case, a rotation speed (an average rotation speed) $\omega(0)$ is calculated from the pulse widths T(0) to T(3) from the present pulse edge to four pulse edges before the present pulse edge. After that, when the next pulse edge is detected, the rotation speed $\omega(0)$ is updated by newly calculated pulse widths T(0) to T(3). In the meantime, the previous rotation speed $\omega(0)$ is stored as a rotation speed $\omega(1)$. In this manner, the latest eight rotation speeds $\omega(0)$ to $\omega(7)$, which are updated every time the pulse edge is detected (according to each predetermined movement or each predetermined rotation angle), are constantly stored in the controller 31. In this fashion, by calculating the rotation speed $\omega$ from a plurality of pulse widths T, fluctuations in sensor duty of each pulse signal output that is received can be evened out, and a rotation speed with its error variation canceled can be calculated.

In addition, although the rotation speed $\omega$ is calculated from the pulse widths T(0) to T(3), by further averaging sequential m rotation speeds, which are calculated in this way, an even more averaged rotation speed $\omega$ may be calculated.

Secondly, the controller 31 calculates a rotation speed difference (the changing rate of the rotation speed) $\Delta\omega(0)$ from this rotation speed $\omega$ (step S2). More specifically, rotation speeds $\omega(0)$ to $\omega(3)$ are rendered the present block data, and rotation speeds $\omega(4)$ to $\omega(7)$ are rendered previous block data, thereby performing subtraction on each sum of data in the corresponding block. That is, the rotation speed difference $\Delta\omega$ is calculated by subtracting the sum of the rotation speeds $\omega(0)$ to $\omega(3)$ from the sum of the rotation speeds $\omega(4)$ to $\omega(7)$. Whenever the pulse edge is detected (according to each predetermined movement or each predetermined rotation angle), rotation speed differences $\Delta\omega(0)$ to $\Delta\omega(q)$ ($q \geq p$) are updated in forward rotation.

Additionally, a calculated value may be divided by the number (4) of data summed. As above, by calculating the rotation speed difference $\Delta\omega$ from a plurality of rotation speeds $\omega$, the phase difference between the rotation speeds $\omega$ can be canceled.

The controller 31 calculates the rotation speed variation $\Sigma\Delta\omega$ by adding the rotation speed difference $\Delta\omega(0)$ that is calculated on the basis of a predetermined position of the window glass 11 (step S3). Every time the rotation speed difference $\Delta\omega(0)$ is updated, this value is accumulated, thereby calculating a difference of the rotation speed $\omega$ from a reference position.

Following this, whether or not the rotation speed difference $\Delta\omega(0)$ that is calculated exceeds a disturbance determination threshold $\gamma$ on a positive side is determined (step S4). When the vehicle runs on to a bump, or the window glass 11 is closed, the window glass 11 receives an impact by such a disturbance, and consequently the rotation speed of the motor 20 is sometimes influenced. Nevertheless, erroneous detection of the pinching due to the disturbance is restricted by this processing.

Figure 8:
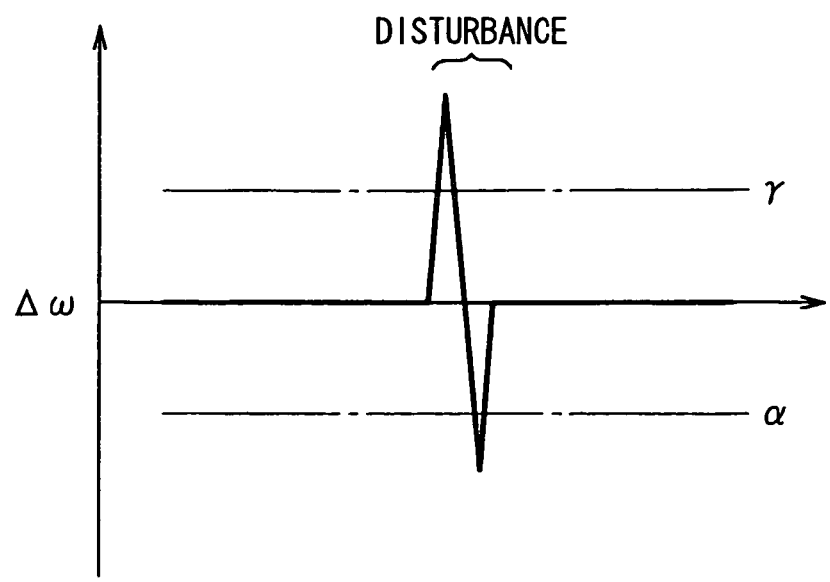
FIG. 8 is a time chart showing a variation in a rotation speed difference when a disturbance is generated.

As shown in FIG. 8, when the disturbance is applied, the rotation speed difference $\Delta\omega$ normally takes a large value on both positive and negative sides. A change of the rotation speed difference $\Delta\omega$ to the positive side means that the rotation of the motor 20 is accelerated in a direction in which the window glass 11 is closed. Conversely, the change of the rotation speed difference $\Delta\omega$ to the negative side means that the rotation of the motor 20 is decelerated. The change of the rotation speed difference $\Delta\omega$ to the negative side simulates the pinching. In addition, the disturbance determination threshold $\gamma$ is a value set on the positive side, and in the controller 31, the disturbance is determined to be caused, when the rotation speed difference $\Delta\omega$ exceeds this disturbance determination threshold $\gamma$ on the positive side.

If the disturbance is determined to be caused (step S4: YES), control proceeds to step S8 after the controller 31 increases the pinching determination threshold $\beta$ to the negative side (step S7). This can restrict an erroneous determination of the pinching, since the subsequent cumulative sum of the rotation speed difference $\Delta\omega$ does not exceed an increased pinching determination threshold despite the detection of the start of the pinching due to the oscillation of the rotation speed difference $\Delta\omega$ to the negative side because of the ongoing disturbance. Additionally, the disturbance determination threshold $\gamma$ may be set irrespective of the variation determination threshold $\alpha$, or the disturbance determination threshold $\gamma$ may be set at a value, a (plus/minus) sign of which is opposite to that of the variation determination threshold $\alpha$.

If the disturbance is not determined to be caused at step S4 (step S4: NO), the controller 31 performs determination processing on the start of the pinching (step S5). More specifically, if the rotation speed difference $\Delta\omega(0)$ exceeds the variation determination threshold $\alpha$ on the negative side, the pinching is determined to be started. If it does not exceed the variation determination threshold $\alpha$ on the negative side, the pinching is not determined to be started.

If the pinching is determined to be started (step S5: YES), control proceeds to step S8. On the other hand, if the pinching is not determined to be started (step S5: NO), the cumulative sum of the rotation speed difference $\Delta\omega$ and the pinching determination threshold β are set at initial values at step S6. More specifically, as well as setting the rotation speed variation ΣΔω calculated at step S3 at an initial variation $S_0$ in the rotation speed ω, the pinching determination threshold β is changed back to a normal value, which is not increased. In this manner, once a disturbance period is determined to be finished, the pinching determination threshold β is changed back to the normal value, and normal processing is performed.

Then, arithmetic processing is performed on a variation S in the rotation speed ω at step S8. In this processing, a corresponding amount to the pinched amount (the rotation speed variation $\Sigma\Delta\omega_\alpha$) after the pinching is determined to be started is calculated.

More specifically, the controller 31 calculates the variation S in the rotation speed ω by subtracting the cumulative sum of the rotation speed difference Δω, which is calculated at step S3 from the initial variation $S_0$ (the cumulative sum of the rotation speed difference Δω) in the rotation speed ω, which is set at step S6 immediately before the pinching is determined to be started.

Accordingly, if the pinching is not determined to be started at step S5, the variation S in the rotation speed ω, which is calculated at step S8, takes the value of 0 (zero). On the other hand, if the pinching is determined to be started at step S5, the variation S in the rotation speed ω, which is calculated at step S8, is equal to the variation in the rotation speed ω from the start of the pinching.

By this means, the controller 31 of the control device 3 functions as a pinched amount calculating device.

In addition, while the variation (the rotation speed variation $\Sigma\Delta\omega_\alpha$) in the rotation speed ω after the start of the pinching is calculated by calculating a difference of the variation from a criteria value, a method for calculating the variation in the rotation speed ω is not limited to this. By initializing the cumulative sum of the rotation speed difference Δω if the start of the pinching is not detected and by not performing the initialization if the start of the pinching is detected, the rotation speed difference Δω only after the detection of the start of the pinching may be accumulated, thereby calculating the variation (the rotation speed variation $\Sigma\Delta\omega_\alpha$) in the rotation speed ω.

Figure 7:
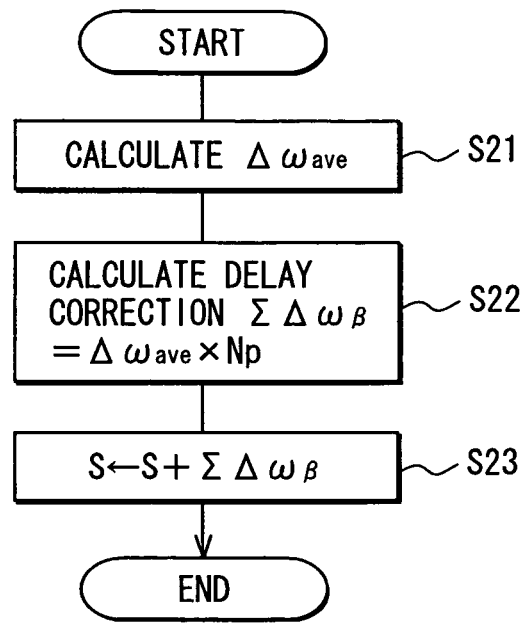
FIG. 7 is a flowchart showing corrective processing of a variation in a rotation speed in FIG. 6.

Next, correction processing is performed on the variation S in the rotation speed ω at step S9 by evaluating the estimated pinched amount during the delay period Td before the pinching is determined to be started (see FIG. 7).

In this processing, the average rotation speed difference $\Delta\omega_{ave}$, which is an average taken from the present rotation speed difference Δω(0) to a rotation speed difference Δω(p) p pulse edges before the present rotation speed difference Δω(0), is first calculated, and this average rotation speed difference $\Delta\omega_{ave}$ is treated as a rotation speed difference during the delay period Td (step S21). By multiplying the average rotation speed difference $\Delta\omega_{ave}$ calculated at step S21 by the number Np of predeterminedly set delayed pulse signals, the rotation speed variation $\Sigma\Delta\omega_\beta$, which is the estimated pinched amount during the delay period Td, is calculated (step S22). In this manner, the controller 31 of the control device 3 functions also as a pinched amount estimating device. When the rotation speed variation $\Sigma\Delta\omega_\beta$ is calculated, the correction processing is performed by adding the rotation speed variation $\Sigma\Delta\omega_\beta$ to the variation S in the rotation speed ω, which is calculated at step S8 (step S23). By this means, a practical variation (i.e., the amount of the pinch load) in a rotation speed due to the pinching can be reliably calculated.

The controller 31 determines whether or not the variation S in the rotation speed ω, which is calculated at step S9, exceeds the pinching determination threshold β (step S10). In this manner, the controller 31 of the control device 3 functions also as a pinching determining device.

If the variation S in the rotation speed ω is determined to be over the pinching determination threshold β (step S10: YES), the controller 31 performs pinching release processing (step S11) and ends the processing. In the pinching release processing, more specifically, the controller 31 drives the motor 20 in reverse to release the foreign object as described above, thereby opening the window glass 11 by a predetermined amount.

On the other hand, if the variation S in the rotation speed ω is determined to be under the pinching determination threshold β (step S10: NO), the controller 31 immediately ends the processing.

Additionally, in the above embodiment, the variation determination threshold α, the pinching determination threshold β, and the disturbance determination threshold γ may be set at a fixed value regardless of a position of the window glass 11, or may be set such that they vary with the position of the window glass 11.

Besides, the opening/closing member control apparatus may be applied to an apparatus that opens and closes an opening/closing member such as a sunroof opening/closing apparatus and a sliding door opening/closing apparatus in addition to the power window device 1 of the vehicle.

What is claimed is:

1. An opening/closing member control apparatus comprising:
   an opening/closing member;
   a driving part to drive the opening/closing member to be opened or closed; and
   a pinching detecting part to detect pinching of a foreign object by the opening/closing member while the opening/closing member is driven to be opened or closed, wherein the pinching detecting part includes:
      a pinched amount calculating means for calculating an amount of the pinching of the foreign object by the opening/closing member;
      a pinched amount estimating means for estimating the amount of the pinching before the pinched amount calculating means calculates the amount of the pinching, in a state in which the foreign object is pinched by the opening/closing member; and
      a pinching determining means for determining the pinching of the foreign object, based on a pinching calculation amount that is calculated by the pinched amount calculating means, and a pinching estimation amount that is estimated by the pinched amount estimating means, wherein the pinching determining means determines the pinching of the foreign object based on a sum of the pinching calculation amount and the pinching estimation amount in comparison to a predetermined pinching determination threshold.

2. The opening/closing member control apparatus according to claim 1, wherein the pinched amount calculating means calculates the amount of the pinching based on a variation of a rotation speed of the driving part to drive the opening/closing member to be opened or closed by a rotary drive.

3. The opening/closing member control apparatus according to claim 1, wherein the pinched amount estimating means calculates the pinching estimation amount based on the pinching calculation amount, which is calculated by the pinched amount calculating means.

4. The opening/closing member control apparatus according to claim 1, wherein the pinched amount estimating means estimates the amount of the pinching based on a variation of a rotation speed of the driving part to drive the opening/closing member to be opened or closed by a rotary drive.

5. The opening/closing member control apparatus according to claim 4, wherein:

the pinched amount estimating means estimates the amount of the pinching as a result of multiplying an average rotation speed difference of the rotation speed by a predetermined number of pulse signals, which are synchronized with the rotation of the driving part; and the average rotation speed difference is an average of the variation of the rotation speed of the driving part between a present pulse count of pulse signals and a predetermined pulse count of pulse signals before the present pulse count.

6. The opening/closing member control apparatus according to claim 5, wherein the predetermined number of pulse signals is set differently according to a magnitude of the average rotation speed difference.

7. An opening/closing member control apparatus comprising:

an opening/closing member;

a driving part to drive the opening/closing member to be opened or closed; and a pinching detecting part to detect pinching of a foreign object by the opening/closing member while the opening/closing member is driven to be opened or closed, wherein the pinching detecting part includes:

a pinched amount calculating means for calculating an amount of the pinching of the foreign object by the opening/closing member;

a pinched amount estimating means for estimating the amount of the pinching before the pinched amount calculating means calculates the amount of the pinching, in a state in which the foreign object is pinched by the opening/closing member, wherein the pinched amount estimating means estimates the amount of the pinching based on a variation of a rotation speed of the driving part to drive the opening/closing member to be opened or closed by a rotary drive, the pinched amount estimating means estimates the amount of the pinching as a result of multiplying an average rotation speed difference of the rotation speed by a predetermined number of pulse signals, which are synchronized with the rotation of the driving part; and the average rotation speed difference is an average of the variation of the rotation speed of the driving part between a present pulse count of pulse signals and a predetermined pulse count of pulse signals before the present pulse count; and a pinching determining means for determining the pinching of the foreign object, based on a pinching calculation amount that is calculated by the pinched amount calculating means, and a pinching estimation amount that is estimated by the pinched amount estimating means.

8. The opening/closing member control apparatus according to claim 7, wherein the predetermined number of pulse signals is set differently according to a magnitude of the average rotation speed difference.

* * * * *